(12) United States Patent
Underhill (10) Patent No.: US 6,247,291 B1
(45) Date of Patent: Jun. 19, 2001

(54) STORAGE APPARATUS FOR ROUND BALER WRAPPING MATERIAL

(75) Inventor: Kenneth R. Underhill, Strasburg, PA (US)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 09/357,904

(22) Filed: Jul. 21, 1999

(51) Int. Cl.⁷ .............................. A01F 15/07; B65B 63/04
(52) U.S. Cl. ................... 53/118; 53/587; 56/341; 242/598.5
(58) Field of Search .................. 53/118, 587, 211, 53/215, 389.2; 242/557, 558, 560.2, 560, 598.2, 598.5; 56/341

(56) References Cited

U.S. PATENT DOCUMENTS

| | | | |
|---|---|---|---|
| 2,576,526 | * 11/1951 | Marchand | 242/598.5 |
| 4,569,439 | * 2/1986 | Freye et al. | 53/118 |
| 4,604,848 | 8/1986 | Clostermeyer . | |
| 4,610,123 | 9/1986 | Krone et al. . | |
| 4,612,855 | 9/1986 | Wagstaff et al. . | |
| 4,841,851 | 6/1989 | Quataert . | |
| 4,956,959 | * 9/1990 | Rumph et al. | 53/118 |
| 4,956,968 | 9/1990 | Underhill . | |
| 5,289,672 | 3/1994 | Underhill . | |
| 5,311,729 | * 5/1994 | Viaud | 53/587 |
| 5,349,806 | 9/1994 | Swearingen et al. . | |
| 5,581,973 | 12/1996 | Underhill . | |
| 5,941,474 | * 8/1999 | Cushing | 242/598.2 |

* cited by examiner

Primary Examiner—Stephen F. Gerrity
(74) Attorney, Agent, or Firm—John William Stader; Larry W. Miller

(57) ABSTRACT

A round baler for forming crop material into cylindrical bales, having a main frame, a plurality of conveying elements supported on main frame for defining a bale forming chamber, and a pickup for feeding crop material into said chamber. The conveying elements each have a crop engaging surface extending transversely of the main frame for forming a cylindrical package of crop material under conditions where the pickup is feeding crop material into the chamber. A dispensing assembly dispenses wrapping material from a storage container into the chamber for wrapping the outer surface of the cylindrical package of crop material to form a round bale. The storage container, mounted in an operative position on the main frame, is pivotable to an inoperative position away from the dispensing assembly for providing unobstructed access to the storage container and the dispensing assembly.

21 Claims, 8 Drawing Sheets

STORAGE APPARATUS FOR ROUND BALER WRAPPING MATERIAL

FIELD OF THE INVENTION

The present invention relates generally to agricultural baling machines for producing cylindrical bales, commonly referred to as round bales, and more particularly to apparatus for storing wrapping material that is used for wrapping a cylindrical package of crop material formed in a bale forming chamber.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed in a continuous stream into a fixed or variable diameter chamber. The hay is rolled into a cylindrical package within the chamber, wrapped with twine, net or the like and ejected onto the ground for subsequent handling.

U.S. Pat. No. 5,289,672, issued Mar. 4, 1994 in the name of Kenneth R. Underhill, and, U.S. Pat. No. 4,956,968, issued Sep. 18, 1990, also in the name of Kenneth R. Underhill, disclose one type of prior art round baler of the general nature described above. In this particular type of baler an expandable chamber is defined by a pair of fixed sidewalls, and a plurality of side-by-side belts cooperating with a series of transverse rolls, mounted between a pair of pivotally mounted arms. This arrangement of rolls and arms is commonly referred to as a sledge assembly. The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber. Density of the bale can be regulated by varying the force on the take up arms.

Another type of prior art round baler of the same general nature employs a plurality of transverse rolls to define a cylindrical bale forming chamber having a fixed diameter. Examples of this type baler are shown in U.S. Pat. No. 4,612,855, issued Sep. 23, 1986 in the name of Robert A. Wagstaff, et al, U.S. Pat. No. 4,604,848, issued Aug. 12, 1986 in the name of Gerhard Clostermeyer, and U.S. Pat. No. 4,841,851, issued Jun. 2, 1989 in the name of Pierre Quataert. It should be noted that the '851 patent shows additional embodiments wherein a fixed diameter chamber is defined by means other than rolls, i.e., belts (FIG. 7) or transverse slats supported between moving chains (FIG. 8). U.S. Pat. No. 5,349,806, issued Sep. 27, 1994 in the name of John R. Swearingen, et al, and U.S. Pat. No. 4,610,123, issued Sep. 9, 1986 in the name of Bernard Krone, et al, are additional examples of prior art round balers having fixed diameter chambers defined by transverse slats.

The present invention relates to apparatus for storing wrapping material used in a wrapping system for a round baler in which a cylindrical package of crop material is formed in either a fixed chamber or an expanding chamber. For example, the chamber could comprise fixed side walls and an expandable transverse wall defined by a combination of belts and rolls of the general nature described in the '672 patent, cited above. This is one example of the many prior art patents assigned to the assignee, New Holland North America, Inc., that disclose this type of expandable chamber round baler, commonly referred to as a roll-belt round baler. It is not uncommon in prior art roll-belt round balers to dispense the wrapping material from a storage container carried on the baler main frame, as shown in the '968 patent, referred to above.

Alternatively, the present invention is also adaptable to a round baler having a chamber comprising fixed side walls and transverse forming elements at fixed locations in a configuration of the general nature described in the '851 patent, cited above. Again, the supply of wrapping material is carried on the baler mainframe. The '806 and '123 patents, mentioned above, are further examples of prior art balers having a fixed diameter chamber in which the wrapping material is stored on the main frame.

Unique characteristics of the present invention, described below, contribute to a wrapping system for round balers that conveniently stores wrapping material in a location consistent with the appropriate introduction of wrapping material to the periphery of a cylindrical package of crop material formed in the bale forming chamber, regardless of whether the diameter of the chamber is fixed or variable, and regardless of the nature of the transverse wall, i.e., belts, rolls, slats, or a combination of belts, rolls or slats.

Problems have been encountered in conveniently positioning the container for storing wrapping material used in prior art round balers of the general nature described in the preceding paragraphs. When the container is positioned adjacent the dispensing assembly for the wrapping material, it becomes difficult to conveniently access the dispensing assembly and other operative elements of the baler for service and maintenance. The unique features proffered by the structure of the present invention, described below, overcome these problems and contribute to improved performance and operability of round balers having a readily available storage container located adjacent the wrapping assembly. Additionally, these features are consistent with simplification and enhancement of routine serviceability as well as field maintenance, all of which lead to a baler that is significantly more "operator friendly" than prior art balers.

SUMMARY OF THE INVENTION

Accordingly, one object of the present invention is to provide a round baler having a pivotable storage container for wrapping material that affords convenient access for replenishing the supply of wrapping material.

Another object of the present invention is to provide a round baler having a storage container for wrapping material that pivots on the frame to an inoperative position that affords unobstructed access to baler components.

Still another object of the present invention is to provide a round baler having a pivotally mounted storage container for wrapping material that is operative to automatically engage a drag mechanism when it is positioned to dispense wrapping material.

Yet another object of the present invention is to provide a round baler having a pivotally mounted storage container for wrapping material that is operative to automatically engage a measuring mechanism when it is positioned to dispense wrapping material being dispensed.

A further object of the present invention is to provide a round baler having a pivotally mounted container for wrapping material that pivots between operative and inoperative positions without affecting the operability of the dispensing apparatus for the wrapping material.

In pursuance of these and other important objects the present invention contemplates improvements to a round baler for forming crop material into cylindrical bales, wherein the baler comprises a main frame, a plurality of conveying elements supported on the main frame for defining a bale forming chamber, and a pickup for feeding crop material into the chamber. The conveying elements each have a crop engaging surface extending transversely of the main frame for forming a cylindrical package of crop material under conditions where the pickup is feeding crop material into the chamber. The baler further comprises a supply of wrapping material, a dispensing assembly including means for dispensing wrapping material from the supply of wrapping material into the chamber for wrapping the outer surface of the cylindrical package of crop material to form a round bale of crop material, storage means for storing the supply of wrapping material, and means for mounting the storage means in an operative position on the main frame. More particularly the invention contemplates mounting means that include means for pivoting the storage means to an inoperative position away from the dispensing assembly for providing access to the storage means and the dispensing assembly, as well as the forwardly located conveying elements that define the bale forming chamber.

The foregoing and other objects, features and advantages of the invention will appear more fully hereinafter from a consideration of the detailed description which follows, in conjunction with the accompanying sheets of drawings wherein the principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
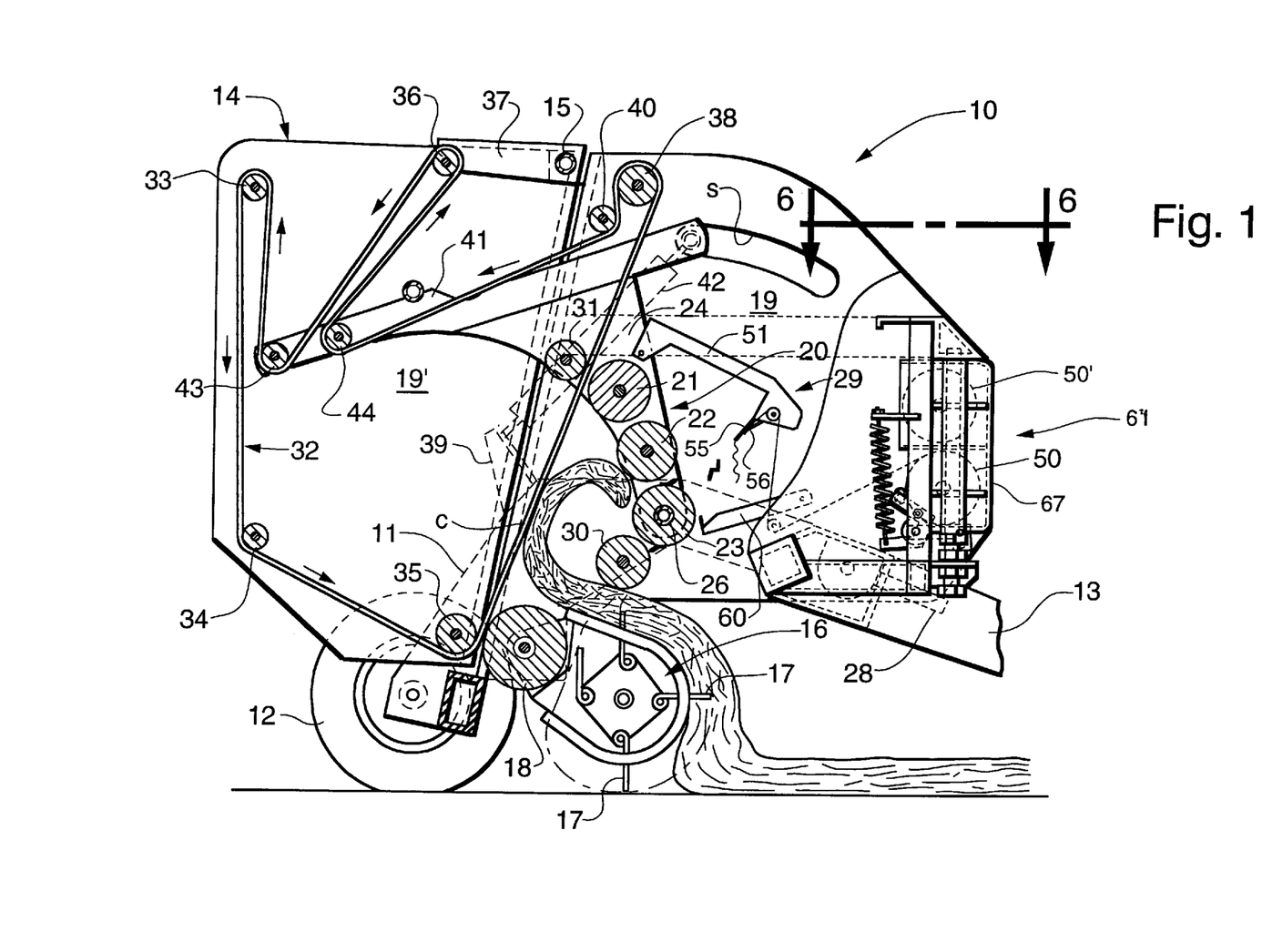
FIG. 1 is a cross sectional diagrammatic side elevational view of a round baler in which the present invention is incorporated. The tailgate is in the closed position and the elements of the bale forming chamber are shown in their core starting condition.

Referring to the drawings for a detailed description of the preferred embodiment of the present invention, FIG. 1 shows the cross section of a round baler 10 of the type in which the present invention is readily embodied. Baler 10 has an expandable bale forming chamber defined in part by belts and rolls. This type of expandable chamber is disclosed in various prior art patents, e.g., U.S. Pat. No. 4,956,968 mentioned above, which is hereby incorporated by reference. It should be noted that throughout this description the drawings are diagrammatic in nature to best show the elements of the baler in which the preferred embodiment of the invention is embodied. To this end, in many instances only one element in a pair is shown, especially in those cases where identical elements exist, disposed on opposing sides of the baler, e.g., wheels.

Baler 10 has a main frame 11, comprising a plurality of rigid structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 by a pair of stub shafts 15 (only one shown) is a tailgate 14 which is closed during bale formation. Tailgate 14 includes walls 19' coplanar with side walls 19. A pickup 16, mounted on main frame 11, has a plurality of tines 17, the tips of which are movable along a predetermined path to lift crop material from the ground and deliver it rearwardly along a generally horizontal path toward a floor roll 18, rotatably mounted on main frame 11.

An expandable chamber for forming bales is defined by side walls 19', 19, belts, and a sledge assembly 20, operative between the inwardly facing surfaces of such side walls. Sledge assembly 20 comprises a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, intermeshing gears) coupled via an appropriate drive train to a drive shaft 28. A starter roll 30, located adjacent roll 23, is also driven counter-clockwise. Sledge assembly 20 includes a forth roll, a freely rotatable idler roll 31 carried between arms 24, commonly referred to as a follower roll.

Figure 2:
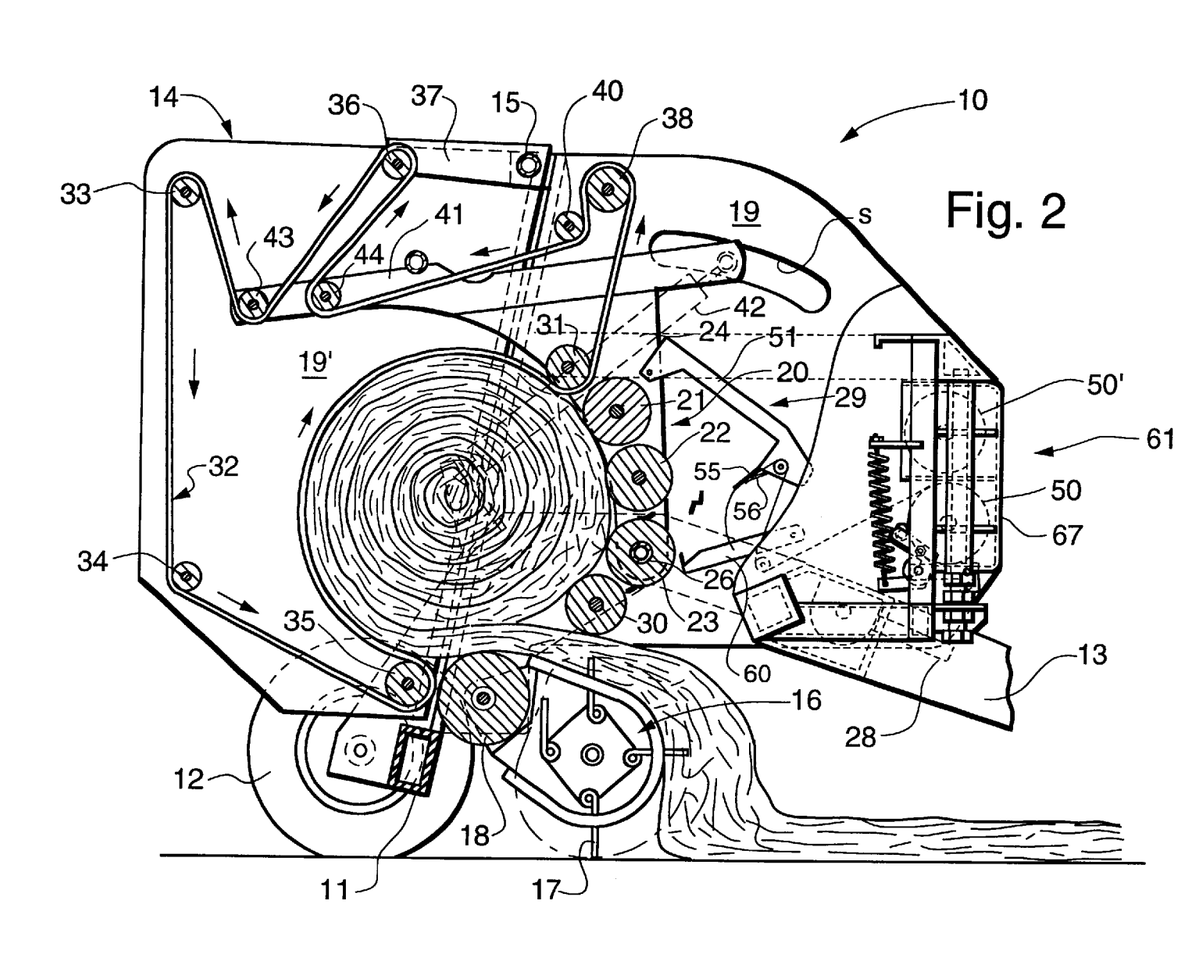
FIG. 2, generally similar to FIG. 1, is a cross sectional diagrammatic side elevational view of a round baler in which the tailgate is in the closed position and the elements of the bale forming chamber are shown in an intermediate bale forming condition.
Figure 3:
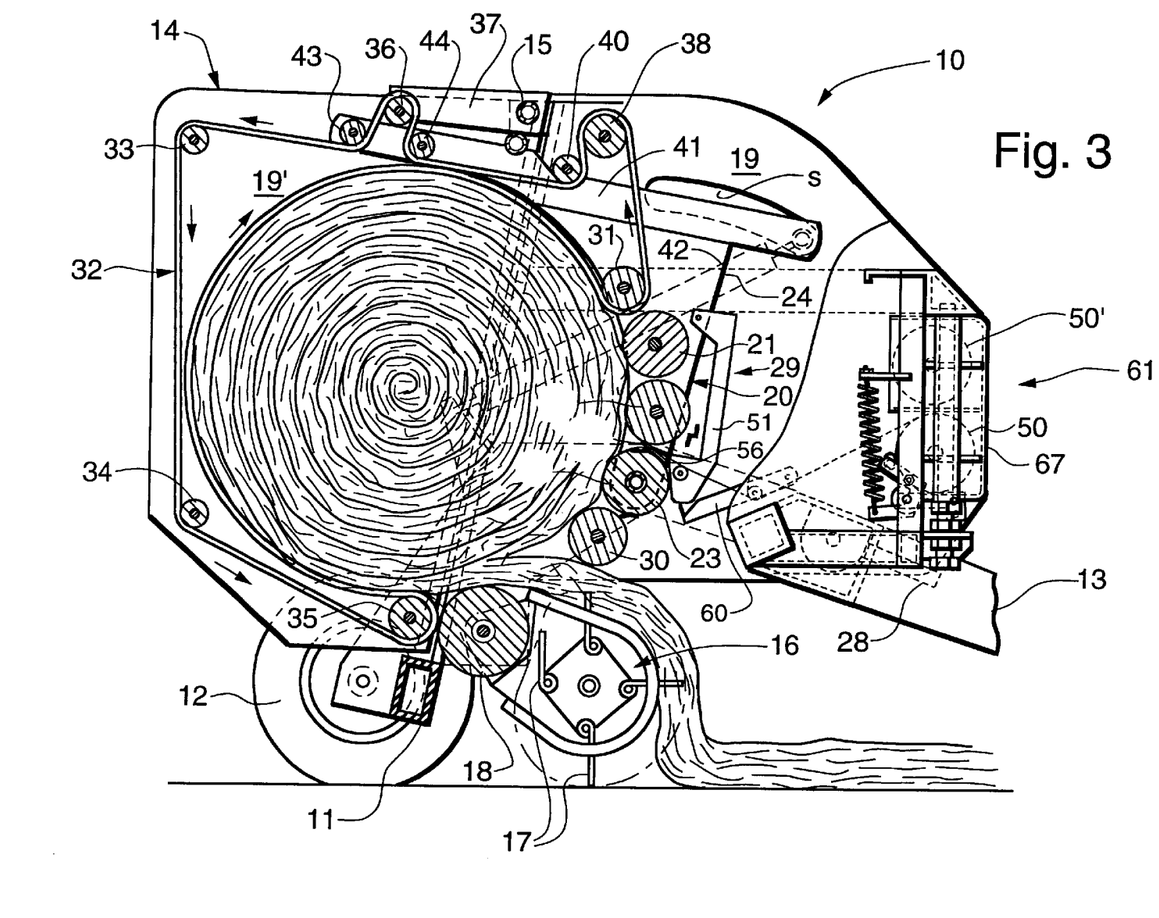
FIG. 3, also generally similar to FIG. 1, is a cross sectional diagrammatic side elevational view of a round baler in which the tailgate is in the closed position, the elements of the bale forming chamber are in the full bale condition, and the wrapping mechanism is in the dispensing position.

Net wrapping apparatus, generally designated by reference numeral 29 in FIGS. 1–4, is mounted between walls 19 on main frame 11 and sledge assembly 20 forwardly of the bale forming chamber. Net, stored in a compartment, generally designated by reference numeral 61, is dispensed from a supply roll 50 to the chamber via an opening between rolls 22, 23, as shown in FIG. 3. A spare roll 50' of net is also stored in compartment 61. Similar mechanisms for dispensing wrapping material are shown in U.S. Pat. Nos. 4,956,968 and 5,289,672, mentioned above.

The bale forming chamber of baler 10 is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Apron 32 passes between roll 21 and follower roll 31, and is in engagement only with follower roll 31 and not roll 21. In addition to its bale forming function, roll 21 serves to strip crop material from the belts, and as such is commonly referred to as a stripper roll.

Suitable coupling means (not shown) connected to drive shaft 28 provide for rotation of drive roll 38. This causes movement of apron 32 along its varying path in the direction indicated by arrows in FIGS. 1, 2 and 3. An additional guide roll 40 on main frame 11 ensures proper driving engagement between the surfaces of the belts of apron 32 and the surface of drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by tension spring 42, mounted between one of arms 41 and main frame 11 by bracket assembly 39, affixed to main frame 11. Spring 42, mounted outwardly from wall 19, is pivotally secured to arm 41 by journal means extending through access slot s in side wall 19. While one function of spring 42 is to return the sledge and takeup assemblies to the start position after a bale is discharged, another equally as important function is to provide a force on sledge assembly 20 that resists expansive forces on the chamber.

Under conditions where the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and cooperates with starter roller 30 to provide a transverse inlet for crop material. During baling, pickup tines 17 lift crop material from the ground and deliver it through the inlet to floor roll 18, which conveys it rearwardly to apron inner course c (FIG. 1). The apron belts then urge it upwardly and forwardly into engagement with the rolls on sledge 20. In this manner crop material is coiled in a clockwise direction to start a bale core. Continued feeding by pickup tines 17 urge crop material into the bale forming chamber in a generally spiral fashion. This causes the apron inner course c to expand around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described, it is wrapped by wrapping apparatus 29, utilizing either twine, plastic or net to encompass the package and form a round bale. Tailgate 14 is then opened and the completed bale is ejected rearwardly (FIG. 4) to a position on the field clear of the tailgate, whereupon the paths of the inner and outer courses of apron 32 return to the locations shown in FIG. 1.

During bale formation, sledge assembly 20, along with the above described integral take up assembly, moves between a bale starting position (FIG. 1) to a full bale position (FIG. 3). This movement of sledge assembly 20 causes idler roll 31 to move along a generally arcuate path while maintaining apron 32 in close proximity to roll 21, thereby allowing roll 21 to strip crop material from the belts and prevent or reduce significantly the loss of crop material through the space between roll 21 and apron 32 during formation of a bale. Sledge assembly 20 is pushed outwardly towards its full bale position during bale formation as the crop material expands against rolls 21, 22, 23 and then subsequently is returned inwardly by apron 32 and spring 42 to the position shown in FIG. 1.

To further enhance understanding of the various features of the present invention, it should be noted that even though a roll-belt baler having a unified sledge and take up assembly is shown the invention is equally adaptable to other types of round baler configurations having wrapping apparatus operative between a storage compartment and a bale forming chamber, e.g., a variable diameter round baler in which the take up arms and sledge are not integral, a round baler having a chamber with a fixed diameter, a round baler having a chamber defined only by belts, rolls or chains and slats, etc. Thus, the many advantages realized by the present invention are not limited to a round baler having elements defining a particular fixed or variable chamber configuration.

Figure 4:
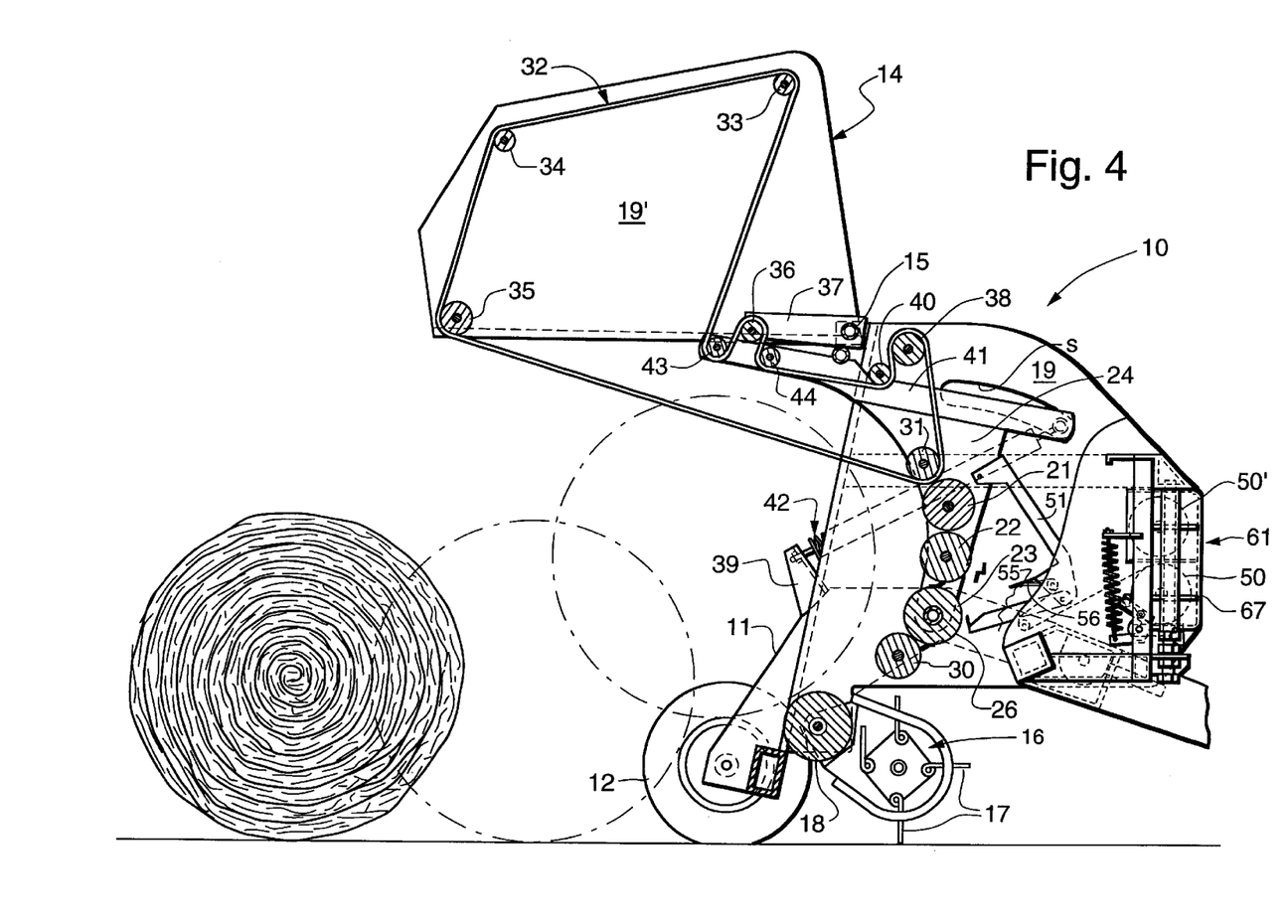
FIG. 4, also a cross sectional diagrammatic side elevational view of a round baler, shows the tailgate in the open position and the relationship of the elements of the bale forming chamber after a cylindrical package of crop material has been wrapped to form a bale and subsequently discharged rearwardly to a location on the field that does not obstruct the tailgate as it is being returned to the closed position shown in FIG. 1.

With the above description and general operation of baler 10 as a background, attention will now be directed to the wrapping system shown. As will become apparent, the wrapping apparatus of baler 10 is merely illustrative of one of the many types to which the features of the present invention are adaptable. For example, although a net wrapping system is shown, utilization of plastic wrap or twine would have no affect on the general aspects of the present invention. With reference back to FIGS. 1–4, wrapping apparatus 29 more particularly comprises net insertion assembly 51 shown, firstly, in its inactive condition in FIG. 1, under conditions where a bale core is being initiated in the chamber, secondly, while still in its inactive condition, it is shown in FIG. 2 in the position it takes as the cylindrical package of crop material is being formed, and, lastly, net insertion assembly 51 is shown in the dispensing condition in FIG. 3. FIG. 4 shows the relationship of the various elements and assemblies of the baler after a cylindrical package of crop material has been wrapped and discharged rearwardly from the bale forming chamber. More particularly, FIGS. 1–4 show active net roll 50 operatively mounted for dispensing net, via wrapping apparatus 29, along a path defined by a series of guide rolls, to clamping members 55, 56, (descriptively referred to as the duckbill). The net is finally severed by a knife mounted on arm 60, in a manner known in the art, e.g., severing systems of this type are shown in U.S. Pat. Nos. '672 and '968, referred to above. For the purposes of this description, net is shown in FIG. 3 as being dispensed into the bale chamber via transverse clamping members 55, 56 of insertion assembly 51. An insertion assembly of this type is shown in the '968 patent, referred to above and hereby incorporated by reference. A twine arm assembly, shown in U.S. Pat. No. 5,581,973, issued Dec. 10, 1996 in the name of Kenneth R. Underhill is also adaptable for use with net insertion assembly 51. In the '973 patent both twine and net wrapping systems are contemplated on the same baler, which is a fixed diameter chamber baler employing rolls in combination with chains and slats to define the chamber. It should be noted that, even though net wrapping is illustrated for the purposes of this description, the insertion of twine or plastic webbing into the bale forming chamber is also contemplated. To this end, reference is again made to U.S. Pat. No. 5,581,973, assigned to a common assignee. The '973 patent, hereby incorporated by reference, shows apparatus for wrapping with net and/or twine.

Figure 5:
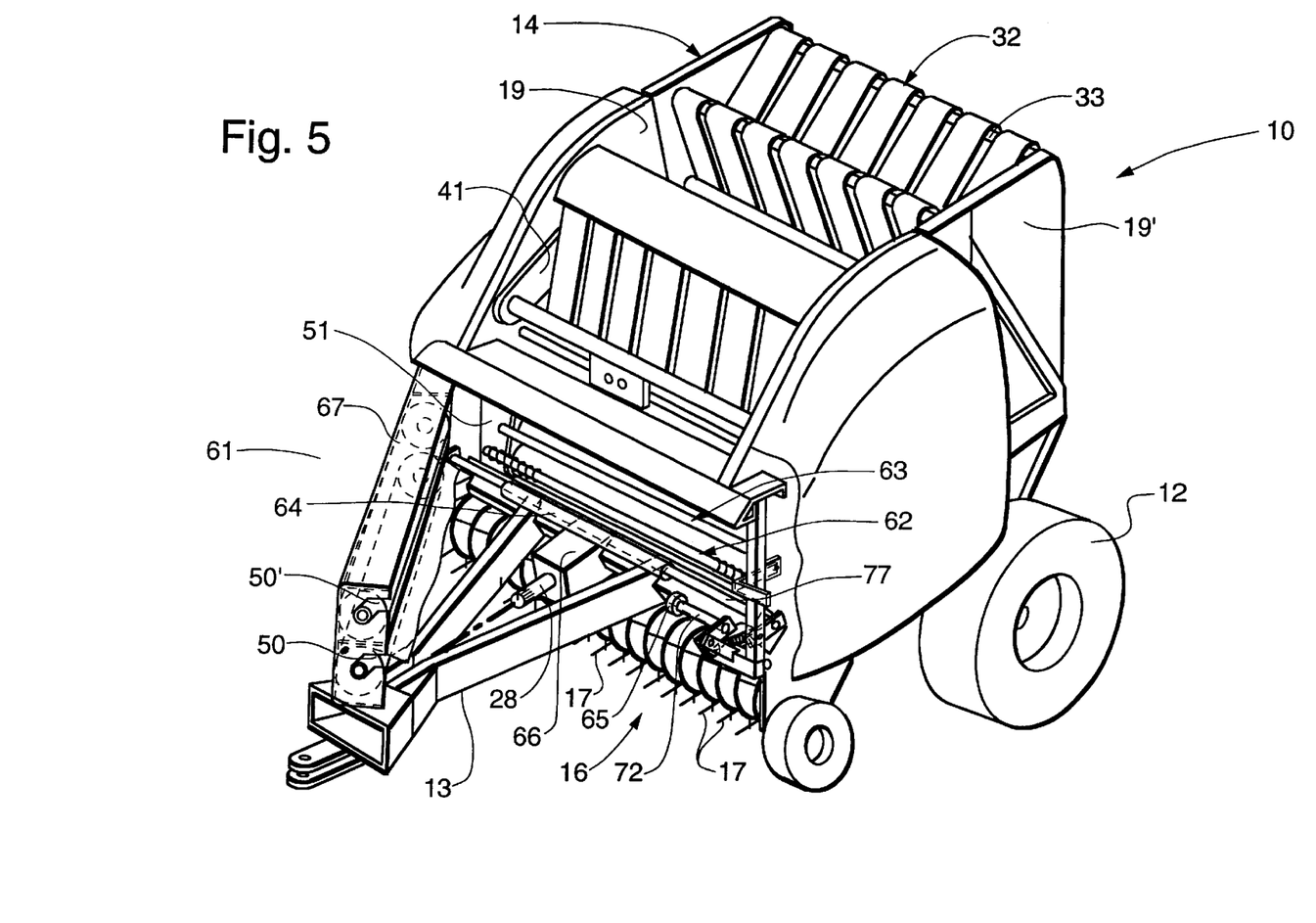
FIG. 5 is a perspective view of a round baler showing the pivotally mounted storage compartment of the present invention in the open position.

Now turning to the crux of the present invention, FIG. 5 shows a perspective view of round baler 10 on the frame of which storage compartment 61 is mounted for storing a supply of wrapping material 50, 50'. More particularly, FIG. 5 shows compartment 61 pivoted away from the dispensing assembly for providing convenient access to the storage compartment itself for reloading or changing wrapping medium. For example, spare roll 50' can be loaded into the dispensing location at which roll 50 is shown, when the net on roll 50 becomes depleted. Further, in this open position various internal components, not the least of which are those of the sledge assembly and wrapping mechanisms, are readily accessible for maintenance and repair. Also, the spreader roll 62 and guide roll 63 about which the net is guided are convenient for threading during initial introduction of the wrapping material, as are other elements used for guiding twine or webbing material depending on the system employed. Net drag sleeve 64 and counter roll 65, shown in FIG. 5 and discussed in further detail below, are other examples of operative round baler elements that are accessible as a result of the structure of the present invention. Equally as important from a maintenance standpoint is the convenient accessibility of gearbox 66.

Figure 6:
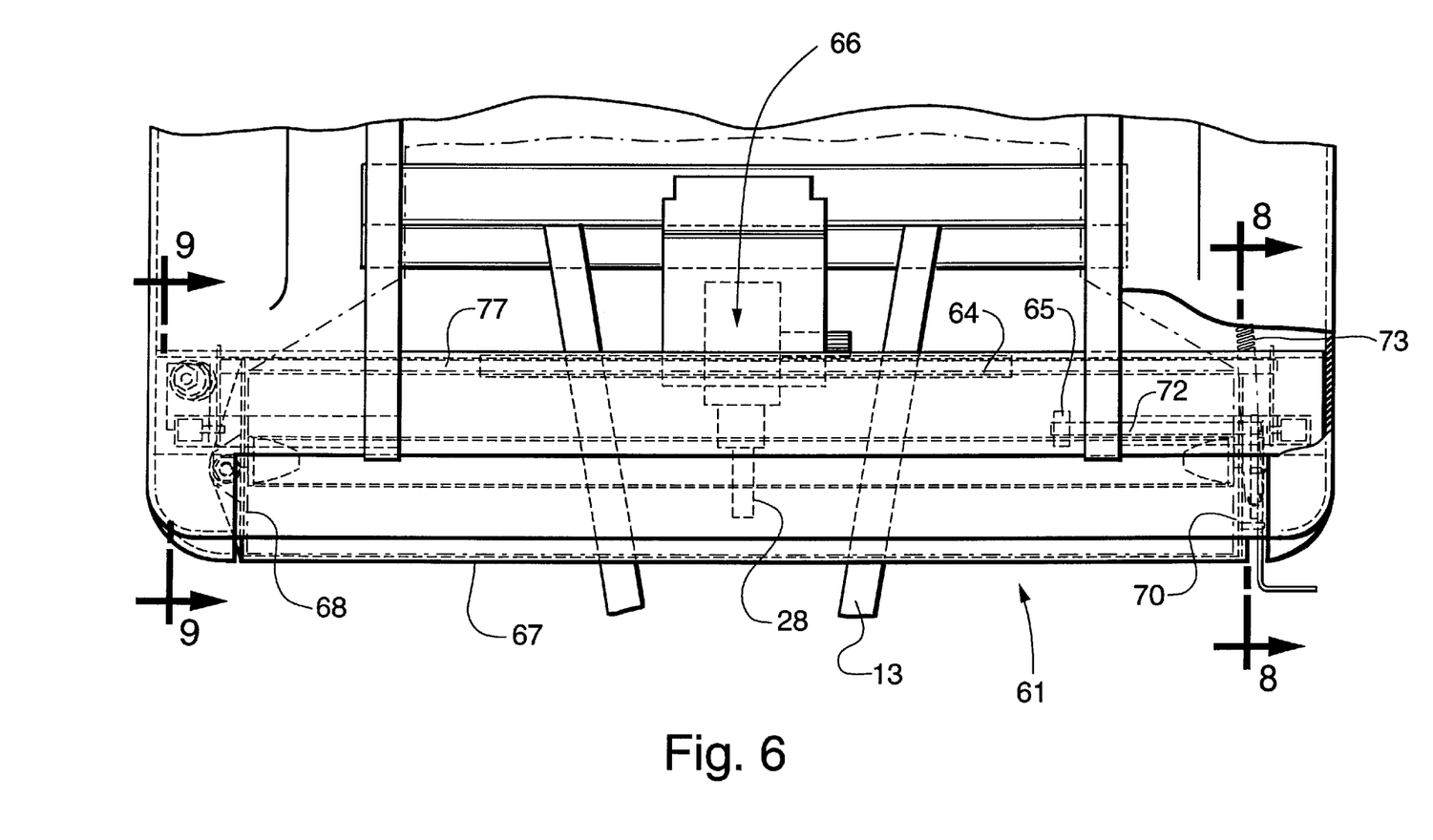
FIG. 6 is a plan view taken along line 6—6 of FIG. 1 showing the storage compartment of the present invention in the closed position.
Figure 7:
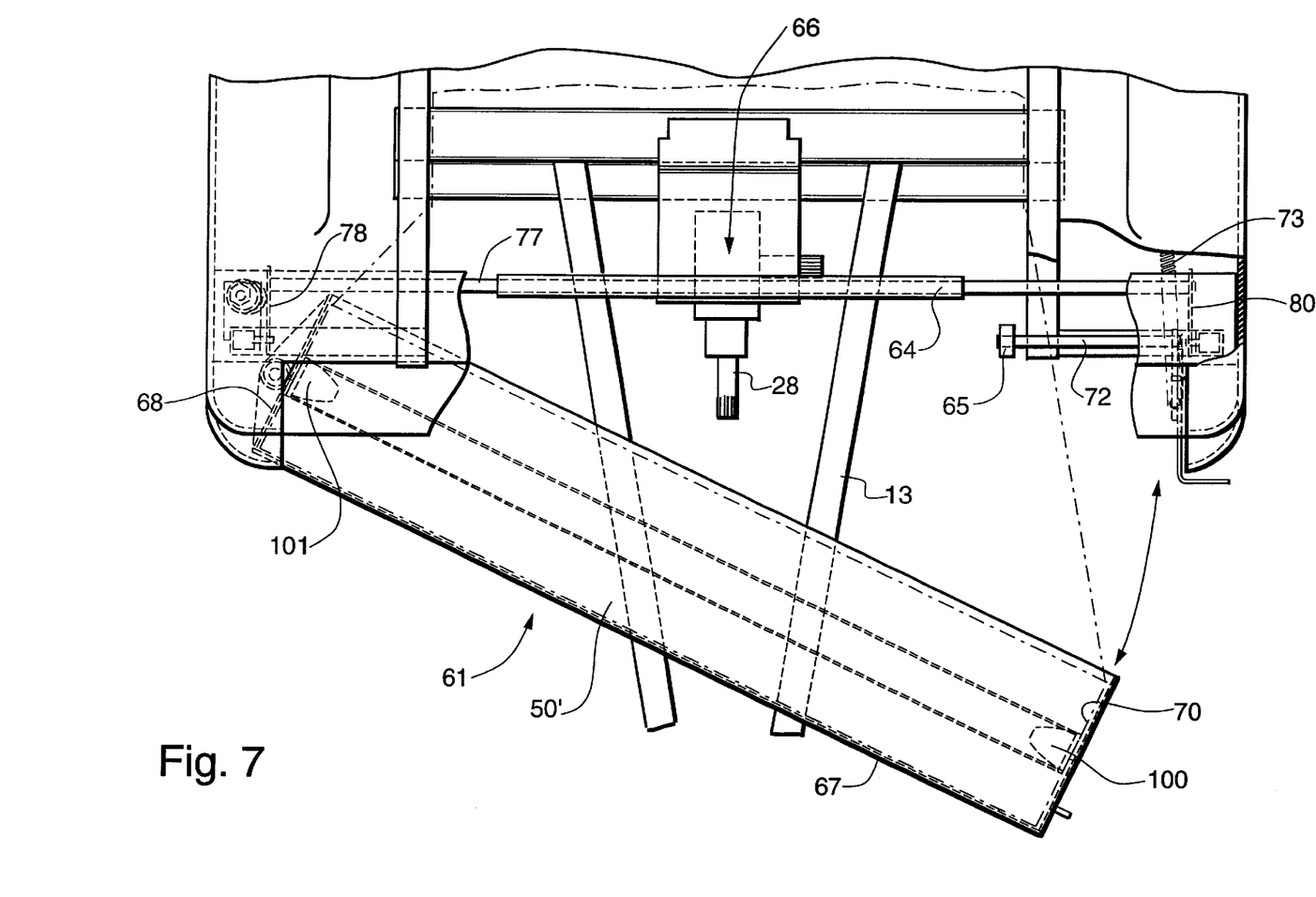
FIG. 7 is a view similar to FIG. 6 showing the storage compartment of the present invention in the open position.
Figure 9:
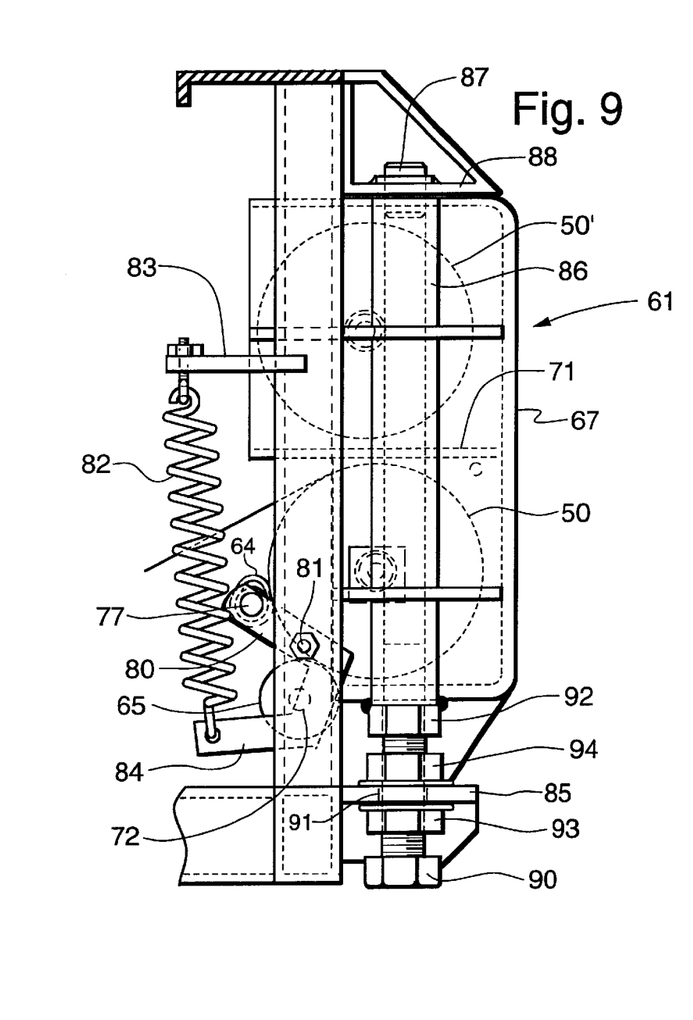
FIG. 9 is a view taken along line 9—9 in FIG. 6.

FIGS. 6 and 7 are top views showing storage compartment 61 in closed and open positions, respectively. The compartment comprises an outer wall 67, generally U-shaped in cross section, and opposing end walls 68, 70. A divider wall 71 (see FIG. 9) serves to partition off an upper storage location for spare net roll 50', and a lower storage location from which net is dispensed from roll 50. By utilizing vertical partitions, these areas can readily be partitioned off to accommodate a plurality of twine rolls.

Figure 8:
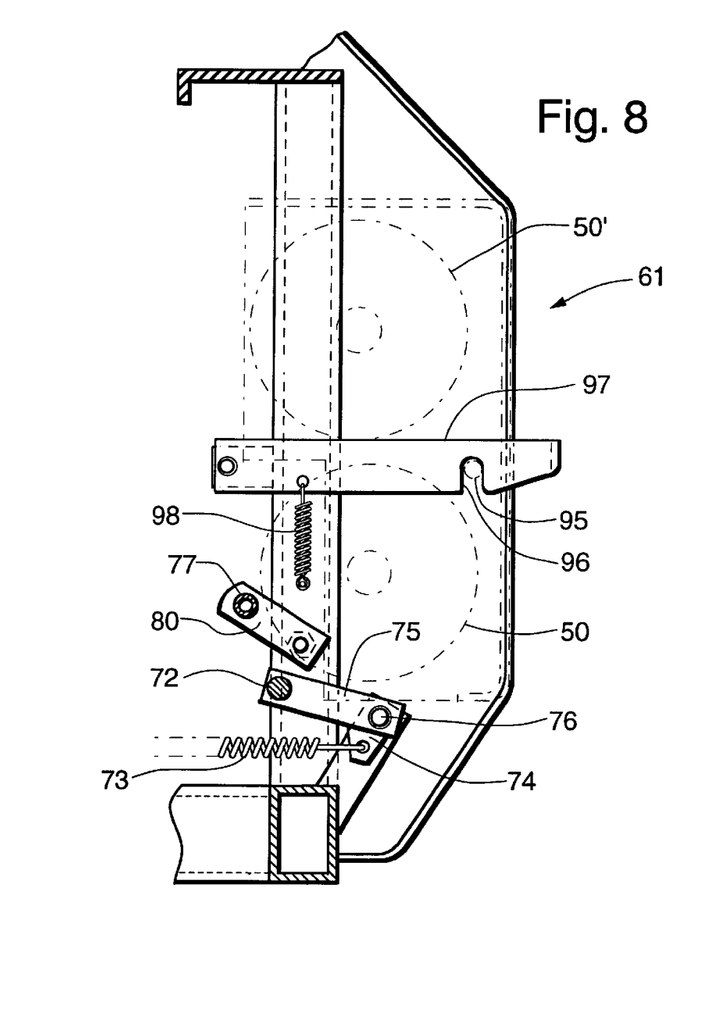
FIG. 8 is a view taken along line 8—8 in FIG. 6.

Counter roll 65, keyed on transverse shaft 72, is urged against the outer surface of roll 50 by spring 73 (see FIG. 8) to measure the amount of net dispensed, i.e., counter roll 65 rotates in concert with the outer surface of net roll 50 as net is being dispensed. This provides a signal indicative of the amount of net dispensed in a conventional manner. To carry this out, spring 73, secured via tab 74 to pivot arm 75 urges transverse shaft 72 in a clockwise direction toward the periphery of net roll 50 about pivot 76.

In a similar manner, drag sleeve 64 mounted on shaft 77 is also urged against the outer surface of net roll 50 to control the dispensing action of the net in a conventional manner. Shaft 77 is mounted between a pair of arms 78, 80 pivotally mounted to the baler frame. Arm 80, pivoted at pin 81, is urged in a clockwise direction toward net roll 50 by tension spring 82 extending between fixed mounting arm 83 and crank arm 84 integral with to arm 80.

FIG. 7 shows counter roll 65 and drag sleeve 64 in their nonoperative positions, under conditions where the compartment has been pivoted open about a pivot assembly, extending upwardly from support bracket 65. The pivot assembly has a tubular body portion 86, a top journal pin 87, welded to tubular frame member 88, and a lower adjustable threaded mounting bolt 90, extending through a slot 91 in support bracket 85, that turns in nut 92 affixed to tubular body portion 86. Vertical adjustment is accomplished by turning the head of bolt 90 to change the position of nut 92 until a desirable adjustment is reached, whereupon locking nuts 93, 94 are locked against bracket 85. Slot 91 extends from side to side a distance sufficient to permit tilt adjustment of compartment 61, i.e., by shifting the position of bolt 90 along slot 91 the slant angle of compartment 61 is varied.

In operation, roll 50 is urged against counter roll 65 and drag sleeve 64 when the compartment is pivoted from its open inoperative position to its closed operative position, regardless of the amount of net remaining on the roll. Under conditions where the compartment is pivoted from its closed latched position to its open position the net material will stay in its operative threaded position, i.e., the slack will be taken up upon resumption of wrapping. Latching is accomplished by pin 95 received in slot 96 of pivotally mounted latch arm 97, urged downwardly by tension spring 98. A phantom outline (FIGS. 6 and 7) shows the maximum width of wrapping material accommodated by storage compartment 61, although in practice it has been determined that a net width matching the approximate width of the chamber is preferred. Variation of the position of mounting spindles 100, 101 is readily effected to match the desired net roll width.

Of the many implicit and explicit advantages of the present invention, one of the most important is the ability to function in a plurality of round baler configurations, i.e., rolls, belts and rolls, or even a chain and slat configuration, as long as the wrapping apparatus of the baler is operative in the vicinity between the storage compartment and an inlet to feed wrapping material to the bale forming chamber. Further, the chamber having such inlet, could be a fixed or variable diameter bale forming chamber, and the wrapping medium could be twine, net or plastic sheets or webbing.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a round baler for forming crop material into cylindrical bales, said baler having a main frame, a plurality of conveying elements supported on said main frame for defining a bale forming chamber, a pickup for feeding crop material into said chamber, said conveying elements each having a crop engaging surface extending transversely of said main frame for forming a cylindrical package of crop material under conditions where said pickup is feeding crop material into said chamber, a supply of wrapping material, a dispensing assembly including means for dispensing wrapping material from said supply of wrapping material into said chamber for wrapping the outer surface of said cylindrical package of crop material to form a round bale of crop material, storage means for storing said supply of wrapping material, and means for mounting said storage means in an operative position on said main frame, the improvement comprising said means for mounting including vertically oriented pivot means for pivoting said storage means to an inoperative position away from said dispensing assembly for providing access to said storage means and said dispensing assembly, said pivot means including means for varying the position of said pivot means to adjust the vertical position and angle of said storage means.

2. A round baler as set forth in claim 1 wherein
said supply of wrapping material comprises a thin continuous web.
3. A round baler as set forth in claim 2 wherein
said storage means comprise a tubular member from which said continuous web is dispensed.
4. A round baler as set forth in claim 3 wherein
said vertically oriented pivot means is located in the vicinity of one end of said tubular member.
5. A round baler as set forth in claim 4 wherein
said thin continuous web comprises net.
6. A round baler as set forth in claim 4 wherein
said dispensing assembly includes a frictional element for providing drag as said continuous web of wrapping material is dispensed into said chamber, and said improvement further comprises
  means for bringing said supply of wrapping material into engagement with said frictional element under conditions where said storage means is moved from said inoperative position to said operative position.
7. A round baler as set forth in claim 4 wherein
said dispensing assembly includes a metering element for measuring said continuous web of wrapping material as it is dispensed into said chamber, and said improvement further comprises
  means for bringing said supply of wrapping material into engagement with said metering element under conditions where said storage means is moved from said inoperative position to said operative position.
8. In a round baler for forming crop material into cylindrical bales said baler having
a main frame including opposing sidewalls,
means defining a variable diameter bale forming chamber having a generally cylindrical shape with a transverse inlet, said defining means including an apron assembly comprising crop engaging means disposed between said sidewalls,
means for supporting said apron assembly on said main frame,
means for moving said crop engaging means along a path contiguous with a portion of the periphery of said variable diameter chamber,
means for feeding crop material into said chamber through said inlet whereupon said crop material is engaged by said crop engaging means under conditions where said crop material engaging means are moving along a portion of said periphery to engage said crop material and form it into a compacted cylindrical package as crop material accumulates in said chamber,
a supply of wrapping material,
a dispensing assembly mounted adjacent said bale forming chamber, said assembly including means for dispensing said wrapping material from said supply of wrapping material into said chamber for wrapping the periphery of said cylindrical package of crop material to form a round bale of crop material, the improvement comprising
  storage means for storing said supply of wrapping material, and
  means for mounting said storage means in an operative position on said main frame outwardly from said dispensing assembly,
  said means for mounting including vertically oriented pivot means for pivoting said storage means to an inoperative position away from said dispensing assembly for unobstructed access to said storage means and said dispensing assembly, said pivot means including means for varying the position of said pivot means to adjust the vertical position and angle of said storage means.
9. A round baler as set forth in claim 8 wherein
said supply of wrapping material comprises a thin continuous web.
10. A round baler as set forth in claim 9 wherein
said storage means comprise a tubular member from which said continuous web is dispensed.
11. A round baler as set forth in claim 10 wherein
said vertically oriented pivot means is located in the vicinity of one end of said tubular member.
12. A round baler as set forth in claim 11 wherein
said thin continuous web comprises net.
13. A round baler as set forth in claim 11 wherein
said dispensing assembly includes a frictional element for providing drag as said continuous web of wrapping material is dispensed into said chamber, and said improvement further comprises
  means for bringing said supply of wrapping material into engagement with said frictional element under conditions where said storage means is moved from said inoperative position to said operative position.
14. A round baler as set forth in claim 11 wherein
said dispensing assembly includes a metering element for measuring said continuous web of wrapping material as it is dispensed into said chamber, and said improvement further comprises
  means for bringing said supply of wrapping material into engagement with said metering element under conditions where said storage means is moved from said inoperative position to said operative position.
15. A round baler for forming crop material into cylindrical bales comprising in combination
a main frame,
a plurality of conveying elements supported on said main frame for defining a bale forming chamber,
a pickup for feeding crop material into said chamber,
said conveying elements each having a crop engaging surface extending transversely of said main frame,
said conveying elements comprising at least two transverse rolls mounted in spaced relationship along an arcuate path, said rolls each having a generally cylindrical outer surface,
means for rotating said transverse rolls such that the outer surfaces thereof move in the same direction of travel for forming a cylindrical package of crop material under conditions where said pickup is feeding material into said chamber,
a supply of wrapping material,
a dispensing assembly mounted adjacent said bale forming chamber, said assembly including means for dispensing wrapping material from said supply of wrapping material into said chamber between said transverse rolls for wrapping the outer surface of said cylindrical package of crop material to form a round bale of crop material,
storage means for storing said supply of wrapping material, and
means for mounting said storage means in an operative position on said main frame outwardly from said dispensing assembly, said means for mounting including vertically oriented pivot means for pivoting said storage means to an inoperative position away from said dispensing assembly for unobstructed access to said storage means and said dispensing assembly, said pivot means including means for varying the position of said pivot means to adjust the vertical position and angle of said storage means.

16. A round baler as set forth in claim 15 wherein said supply of wrapping material comprises a thin continuous web.

17. A round baler as set forth in claim 16 wherein said storage means comprise a tubular member from which said continuous web is dispensed.

18. A round baler as set forth in claim 17 wherein said vertically oriented pivot means is located in the vicinity of one end of said tubular member.

19. A round baler as set forth in claim 18 wherein said thin continuous web comprises net.

20. A round baler as set forth in claim 18 wherein said dispensing assembly includes a frictional element for providing drag as said continuous web of wrapping material is dispensed into said chamber, and said means for mounting further comprises means for bringing said supply of wrapping material into engagement with said frictional element under conditions where said storage means is moved from said inoperative position to said operative position.

21. A round baler as set forth in claim 18 wherein said dispensing assembly includes a metering element for measuring said continuous web of wrapping material as it is dispensed into said chamber, and said means for mounting further comprises means for bringing said supply of wrapping material into engagement with said metering element under conditions where said storage means is moved from said inoperative position to said operative position.

* * * * *